United States Patent
Kosanovic

[19]

[11] Patent Number: 6,157,670

[45] Date of Patent: Dec. 5, 2000

[54] BACKGROUND ENERGY ESTIMATION

[75] Inventor: Bogdan Kosanovic, Bethesda, Md.

[73] Assignee: Telogy Networks, Inc., Germantown, Md.

[21] Appl. No.: 09/371,033

[22] Filed: Aug. 10, 1999

[51] Int. Cl.[7] .............................. H04B 17/00; G10L 5/00
[52] U.S. Cl. ..................... 375/227; 375/346; 455/226.1; 455/296; 704/233; 704/248; 704/253
[58] Field of Search .................................. 375/224, 227, 375/285, 296, 346, 254; 381/94.1, 94.7, 66; 455/261.1, 296; 704/233, 248, 253

[56] References Cited

U.S. PATENT DOCUMENTS

| | | | |
|---|---|---|---|
| Re. 32,172 | 6/1986 | Johnston et al. | 704/253 |
| 4,630,304 | 12/1986 | Borth et al. | 381/94 |
| 4,821,325 | 4/1989 | Martin et al. | 704/253 |
| 5,305,307 | 4/1994 | Chu | 370/32.1 |
| 5,553,081 | 9/1996 | Downey et al. | 371/6 |
| 5,596,676 | 1/1997 | Swaminathan et al. | 395/2.17 |
| 5,659,622 | 8/1997 | Ashley | 381/94.1 |
| 5,734,789 | 3/1998 | Swaminathan et al. | 395/2.15 |
| 5,749,072 | 5/1998 | Mazurkiewicz et al. | 704/275 |
| 5,771,440 | 6/1998 | Sukhu et al. | 455/63 |
| 5,819,217 | 10/1998 | Raman | 704/233 |
| 5,890,109 | 3/1999 | Walker et al. | 704/215 |
| 5,920,834 | 7/1999 | Sih et al. | 704/233 |

*Primary Examiner*—Young T. Tse
*Attorney, Agent, or Firm*—Levy & Grandinetti

[57] ABSTRACT

A method of estimating background noise in a signal. The signal is divided into blocks of equal predetermined length. The minimum energy of the signal during the length of each block is determined. The minimum energy determined for the current block is compared to a previous determination of minimum energy. If the current minimum energy exceeds a predetermined maximum energy level, the current block minimum energy is discarded and the previous determination remains unchanged. If the current block minimum energy is below the previous determination, the previous estimate is reduced by the difference between the previous determination and current minimum energy. If the current energy is above the previous determination but below the maximum, the previous estimate is increased by half of the difference between the current energy and the previous estimate. The increase factor may also be adjusted to increase the current estimated energy level by a factor of any amount between and including 0 and 1. The estimation of minimum energy, or background energy, therefore decreases in direct proportion to a drop in minimum energy determination but increases only as a partial factor of new determinations.

7 Claims, 3 Drawing Sheets

BACKGROUND ENERGY ESTIMATION

BACKGROUND OF THE INVENTION

1. Field of the Invention

The present invention relates to a method for estimating the background energy level of a signal. More specifically, the present invention relates to a method for efficient estimation of the background energy of a signal which contains both background and information.

2. Discussion of Related Art

Signals which carry information, including communication signals carrying voice information, often contain a background level of energy or noise in the signal. Background noise can originate from a number of sources, including environmental noise at the origin of the signal or noise induced by a signal carrier. It is often desirable to identify background noise, and such identification can be used in a number of ways when working with an information signal. In communications, it is also desirable to eliminate this background noise to provide a cleaner signal to the recipient, to reduce the overall energy of the signal, or to aid in the identification of echo of other signal anomalies such as double talk and reduce the error rate in transmission. Also, incorrect estimation and compensation for background noise can effect error checking in a digital signal. The background noise determination can also be useful in determining the parameters for the introduction of comfort noise, if desirable.

Background noise can be identified by analysis of the characteristics of the signal. The characteristics of a signal can be evaluated to distinguish noise from other information such as speech. Algorithms for identification of signal characteristics can be complex and require substantial processing power and time. Often a delay must be introduced in order to process the signal for complex recognition and to distinguish speech from noise.

SUMMARY OF THE INVENTION

It is therefore the general object of the present invention to enable estimation of background energy in an information carrying signal.

It is a further object of the invention to simplify the recognition of noise in a signal based upon energy measurement to establish a minimum energy level applied to implicitly distinguish noise from signal information.

It is another object of the invention to estimate the background energy level accurately and reliably without overestimating the energy level so that the reliable estimate of the background energy may be utilized in calculations of other energy measurements or estimates in processing of the signal. Also, the energy estimate can be utilized to remove noise level energy portion of a signal from other calculations or can be utilized in an assessment of the need for noise removal from a signal.

In accordance with the invention, these and other objects are achieved by applying an algorithm to a digital signal to determine the level of energy within the signal which represents background noise. The signal energy is sampled in signal block measurements, and the estimation of background noise is constantly updated based upon the determination of minimum energy in each signal block. An initial value for the maximum acceptable minimum energy of a block is selected, and another value is set for the initial estimation of minimum energy. The minimum energy of the signal during the length of each block is determined. The minimum energy determined for the current signal block is compared to a previous determination of minimum energy to generate a minimum energy estimation for the signal block. From a minimum energy estimation a noise level can then be determined.

BRIEF DESCRIPTION OF THE DRAWINGS

For a better understanding of the nature of the present invention, reference is made to the following figures and detailed description, wherein like elements are accorded like reference numerals, and wherein.

DETAILED DESCRIPTION OF THE PREFERRED EMBODIMENTS AND BEST MODE OF THE INVENTION

In an exemplary embodiment of the present invention, a digital voice signal which includes background noise generated at the source of the signal is analyzed to determine the background noise of the signal through an estimation of the energy level within the signal representing background noise.

Because an overestimation of background noise may cause some of the information signal to be classified as noise and therefore improperly treated, the applied algorithm will tend to minimize estimation of noise. The noise estimation is therefore adjusted more quickly downward based upon a new current energy determination which is lower than the previous determination and is adjusted more gradually upward based upon a new current energy determination which is higher than the previous determination. Alternatively, the current determination can be compared to the current noise estimation instead of being compared to the previous determination. If the current minimum energy exceeds the predetermined maximum energy level, the current block minimum energy is discarded and the previous determination remains unchanged. If the current block minimum energy is below the previous determination, the previous estimation is reduced by a factor of the difference between the previous and current minimum energies. If the current energy is above the previous determination but below the maximum, the previous determination is increased by a factor of the difference between the current energy and the previous energy. Accordingly, the factors can be set such that the estimation of minimum energy, or background energy, decreases in direct proportion to a drop in minimum energy determination but increases only by half in response to an increased determination.

Figure 1:
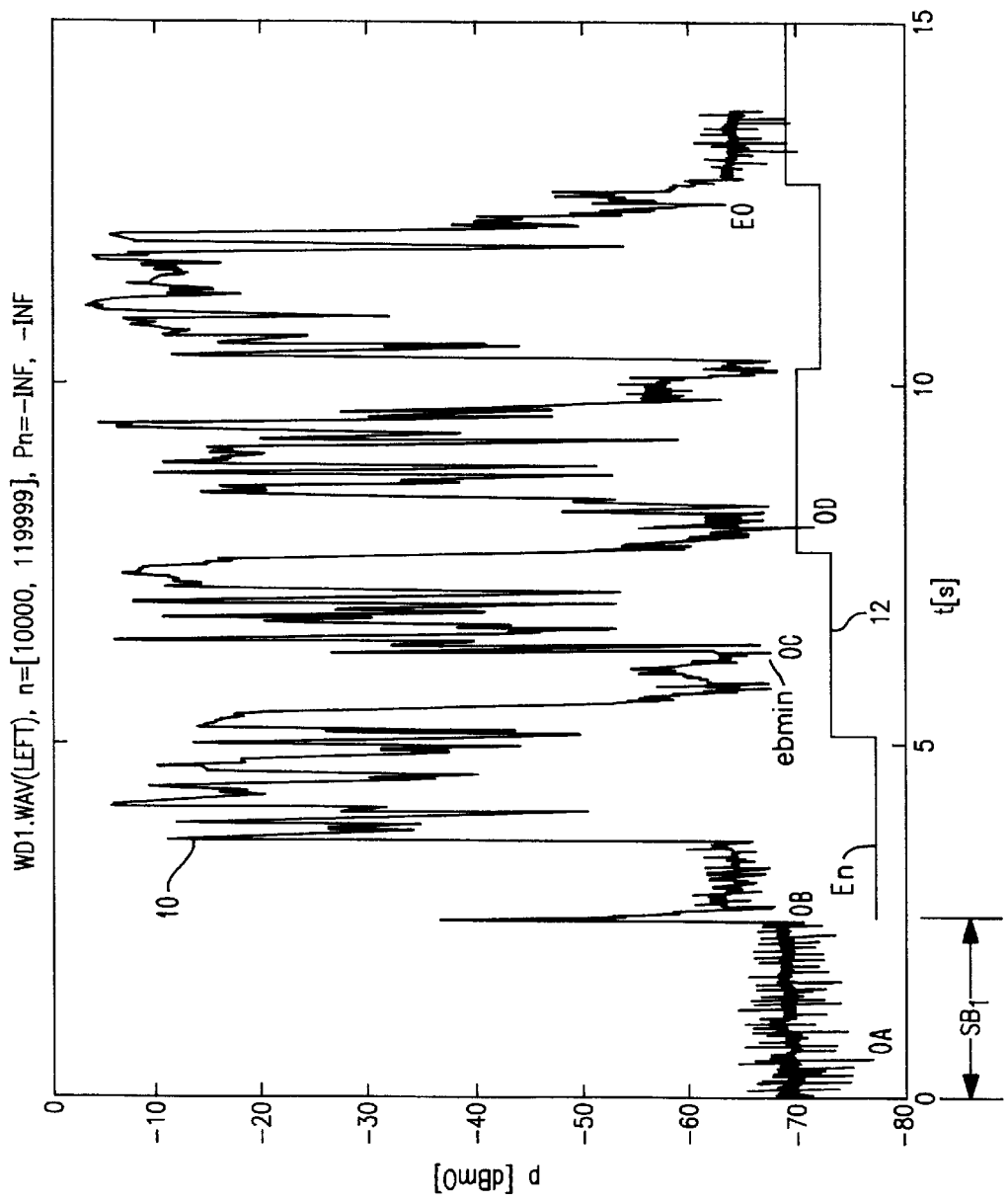
FIG. 1 is a diagram illustrating the relationship between the signal, the minimum measured energy, and the estimated background noise.

In FIG. 1, the signal 10 is illustrated as divided into 2.56 second signal blocks, SB, which are comprised of 2.5 msec segments, S, which consist of twenty samples each. The segments are combined into five msec blocks B. The blocks are grouped into SBs of 2.56 sec. The minimum block energy of each SB is detected. For example, the minimum energy of the first signal block, $SB_1$, is illustrated at point A. The energy of each segment and each block is determined by a standard measurement technique for summing the sample squares into segments and segments into blocks, such as RMS measurement. The minimum energy for each SB, ebmin, is determined from the block energies in the SB. This is the lowest point of energy for the SB and represents the measurement of the minimal energy attributable to background noise for the time period represented by the current SB. Although the discussion herein has focused on the first signal block, $SB_1$, the exemplary values for signal blocks $SB_2$ through $SB_6$ are illustrated as points B through F. Accordingly, the detection of the minimum energy, ebmin, for each SB is critical to providing an accurate estimate of background noise in the signal.

The maximum acceptable minimum block energy, Max, is set to a value below expected minimum voice signal level. Voice will usually be within a predetermined range above Max. See FIG. 2. However, to avoid the misclassification of sustained low voice as noise, Max is established below the expected low threshold for voice. The portions of the signal below Max are accepted as background noise above the minimum energy level, ebmin. Accordingly, the parameters of the noise estimation take into account avoidance of misclassifying voice, noise, and background all within the signal being evaluated.

The value for minimum energy, ebmin, points A through F in FIG. 1, and the estimate of background energy, En, line 12 in FIG. 1, are updated at the end of each 2.56 sec SB based upon the lowest minimum energy detected, ebmin, for any block in the current SB based on the energy summation technique employed. The update period of 2.56 sec in the preferred embodiment is based upon the average duration of speech. Implementation of the present invention includes a predetermined accepted standard maximum interval between pauses in speech. By establishing this maximum speech interval, it can be accepted that a pause in speech will occur at some point during the 2.56 second interval. A pause in speech will last for at least 10 ms, thereby allowing background noise to represent the entire energy level for at least five msec or one block SB. The time periods used in the exemplary embodiment are an example as used in estimation of background noise in a voice signal. However, the scope of the invention should not be limited to the parameters discussed in the examples presented herein. Accordingly, other applications of background estimation in a wide variety of signals will incorporate the fundamental technique taught herein but may adapt different quantities of time periods applicable to the signal being evaluated, such as data, Dial Tone Multi-Frequency (DTMF), facsimile, or other signals.

The update period can be increased or decreased based upon the signal energy being sampled or the parameters established by the implementation of the present invention. Shorter energy sampling time may not allow for actual background noise occurrence, thereby increasing the chance of inclusion of the information signal in the estimate of minimal energy, ebmin. Longer energy sampling time will provide less current estimate of real-time background noise level which can change at a rate more frequent than 2.56 seconds. Less accurate estimate of background energy level will be of less value for application of that estimate to other signal processing such as echo cancellation, noise removal, or comfort noise.

A low value is initially set for the initial estimate of minimal energy, ebmin, for the first signal block $SB_1$, wherein $ebmin_{[k]}$ is reset to a higher value at the start of each subsequent signal block, $SB_k$. The adjustment of ebmin for each succeeding signal block, $SB_{[k+1]}$, reflects the actual low energy point no matter how high the initial estimate of the minimal energy for the succeeding SB. Accordingly, the method incorporates the need to reset the ebmin for each subsequent SB.

Figure 2:
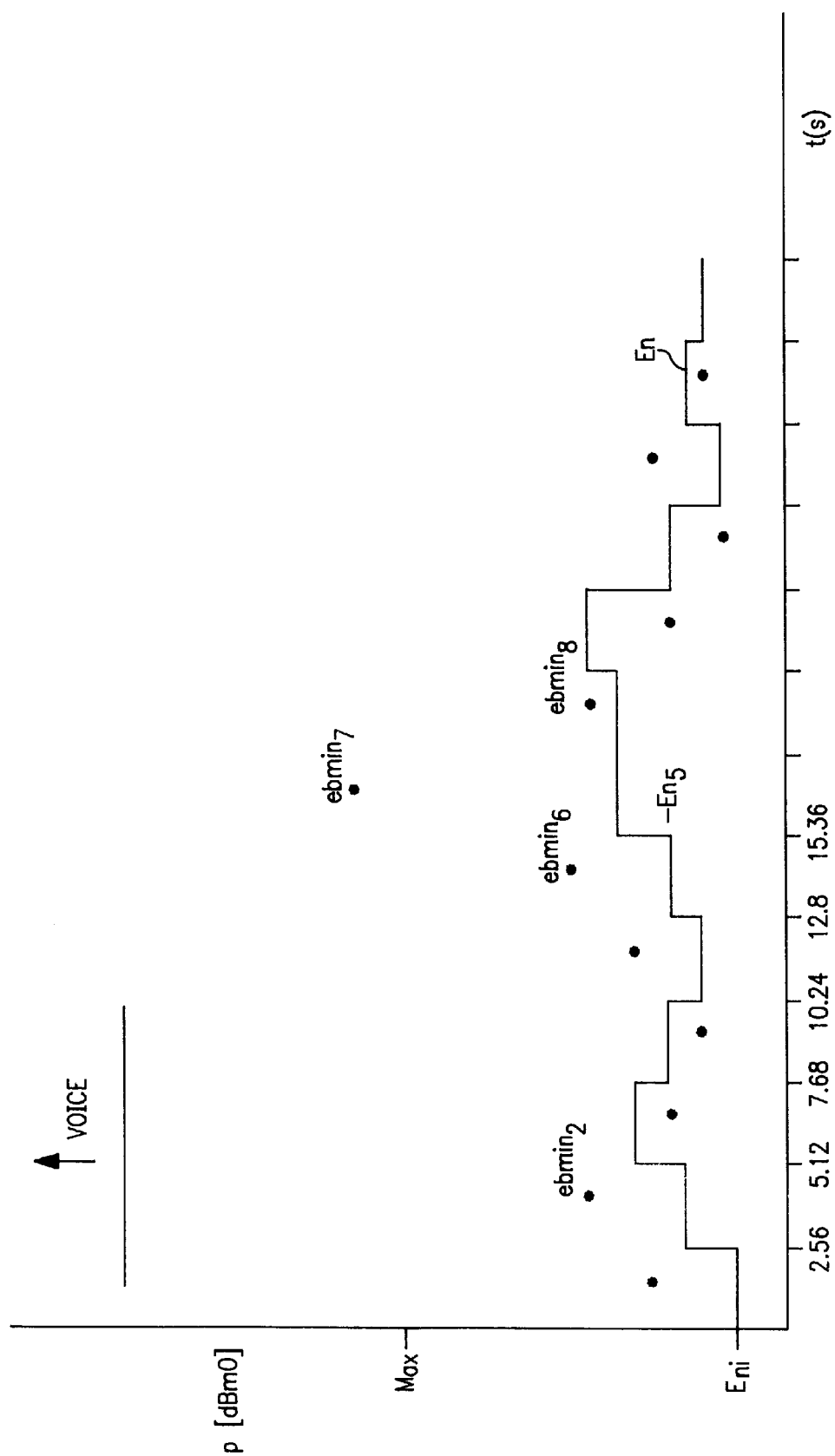
FIG. 2 is a diagram illustrating the relation between minimum measured energy and estimated background noise energy.

FIG. 2 illustrates a second exemplary plot of the calculated ebmin for a set of thirteen signal blocks and the updated estimate of background noise, En. As illustrated in FIG. 1, the estimated background noise, En, will not vary as widely as the measured minimum energy, ebmin, of the signal blocks. At $SB_7$, the measured minimum energy exceeds the Max threshold and therefore the En is not updated. At each SB (1, 2, 5, 6, 11) where the measured $ebmin_{[k]}$ exceeds the previous $ebmin_{[k-1]}$ and is below Max, the En is updated half the difference between $ebmin_{[k]}$ and the measured $ebmin_{[k-1]}$ for the preceding $SB_{[k-1]}$. When the measured $ebmin_{[k]}$ is less than the previous $ebmin_{[k-1]}$ (points 3, 4, 9, 10 and 12), En is updated down to the measured $ebmin_{[k]}$ of the $SB_{[k]}$ to ensure that the estimated background energy level is at a minimum so that low voice is not mistakenly classified as background noise. At point $ebmin_8$, the measured determined minimum energy $ebmin_8$ is compared to $ebmin_6$ because $ebmin_7$ was above Max and therefore discarded. Since $ebmin_8$ is lower than $ebmin_6$, En is updated to the measured $ebmin_{[k]}$ even though this results in a rise of En. As an alternative embodiment, the updated algorithm can be modified to correct for this situation and cause En to remain unchanged. In either embodiment, the estimate of En will remain at or below the current determination of minimum energy ebmin and therefore provides a reliable estimate in accordance with the teachings of the present invention.

For the exemplary embodiment of FIG. 2, En is set to an initial low value. During the first signal block, $SB_1$, the minimum value, $ebmin_1$, is measured. En is updated to $En_1$, which is a value halfway between initial $En_0$ and $En_1$. Since the next value for ebmin increases, En is again updated half the difference between the previous En and the current ebmin. The third value for ebmin decreases therefore $En_3$ is lower, being set equal to the value of $ebmin_3$. This updating process is continued for each SB as illustrated in FIG. 2.

Figure 3:
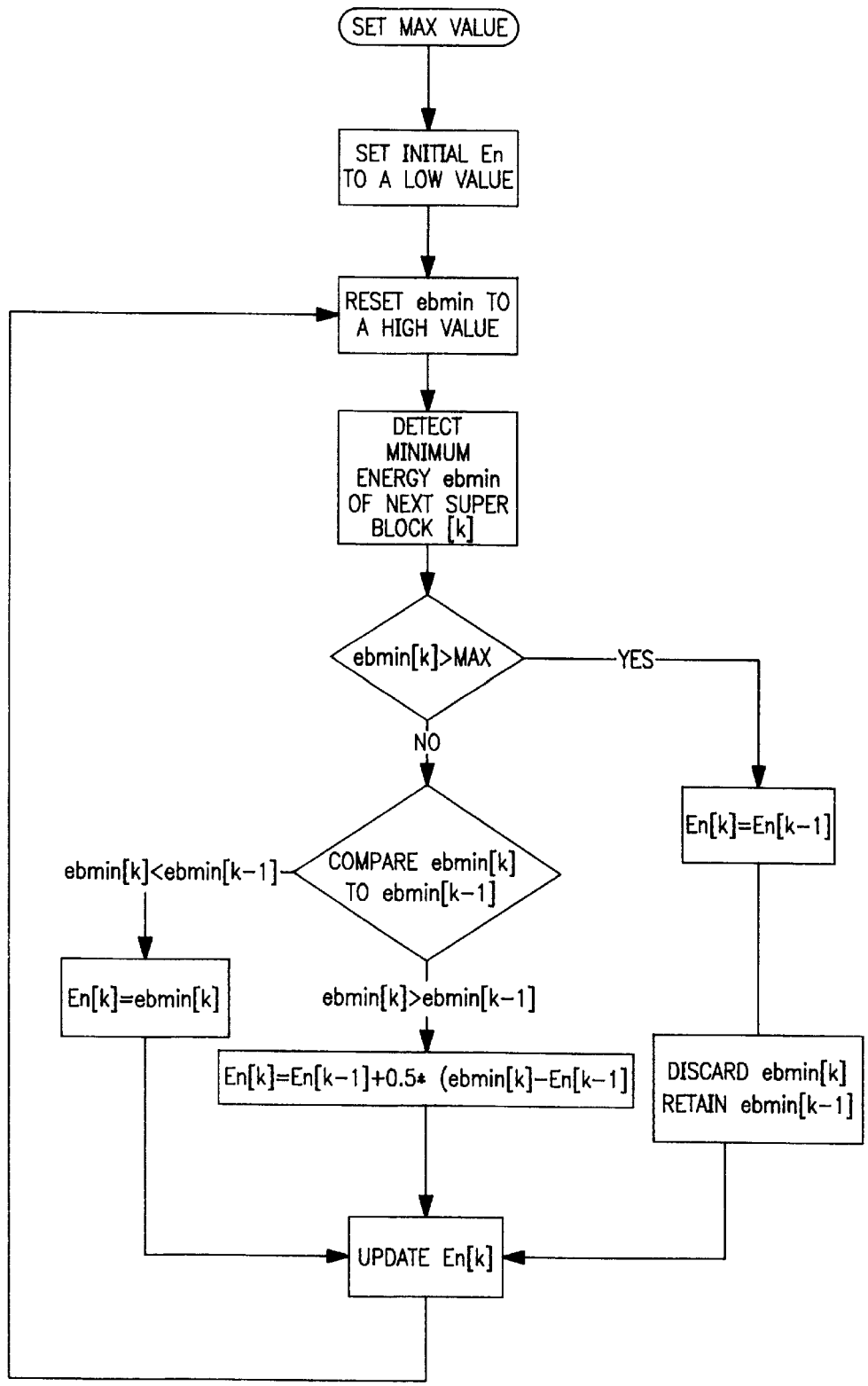
FIG. 3 is a diagram illustrating the derivation of estimated background energy from a signal.

FIG. 3 illustrates a block diagram outlining the algorithm for estimating background noise for the signal. The algorithm incorporates the En and ebmin values for each SB as illustrated in the embodiments of FIGS. 1 and 2.

To obtain the current energy estimate En for the current signal block k, the following formula is applied:

$$En_{[k]} = (1-\alpha)*En_{[k-1]} + \alpha ebmin_{[k]} \qquad \text{Equation 1}$$

The term $\alpha$ in Equation 1 is defined as follows:

$\alpha$ is set to 1 if the energy of the current SB ($ebmin_{[k]}$) is less than the previous SB ($ebmin_{[k-1]}$). When a is set to 1, the current estimate $En_{[k]}$ is equal to the current measurement $ebmin_{[k]}$.

$\alpha$ is set to 0 if the energy of the current SB ($ebmin_{[k]}$) is greater than Max. When $\alpha$ is set to 0, the current estimate $En_{[k]}$ is equal to the previous estimate $En_{[k-1]}$.

$\alpha$ is set to 0.5 if the energy of the current SB ($ebmin_{[k]}$) is greater than the energy of the previous SB (ebmin $_{[k-1]}$) and less than Max. When a is set to 0.5, the current estimate $En_{[k]}$ is halfway between the previous estimate $En_{[k-1]}$ and the current measurement $ebmin_{[k]}$. Therefore, the current estimate $En_{[k]}$ is based on the previous estimate $En_{[k-1]}$ plus a change factor based on α and the current measurement $ebmin_{[k]}$:

$$En_{[k]} = En_{[k-1]} + \Delta \quad \text{Equation 2}$$

The term Δ in Equation 2 is defined as follows:

$$\Delta = \alpha * (ebmin_{[k]} - En_{[k-1]})$$

If: ebmin>Max
  then: α=0
If: ebmin<$ebmin_{[k-1]}$
  then: $\Delta = 1*(ebmin_{[k]} - En_{[k-1]})$
If: ebmin>$ebmin_{[k-1]}$
  then: $\Delta = 0.5*(ebmin_{[k]} - En_{[k-1]})$ This results in the desired direct reduction of noise estimate En when the measured noise of the current signal block $ebmin_{[k]}$ is decreasing from the previous block ebmin $_{[k-1]}$ and provides a factor to reduce the rate of increase of noise estimate En when the measured rate of noise increases from $ebmin_{[k-1]}$ to $ebmin_{[k]}$. Alternative factoring can be used where the value of α varies from 0 to 1 in smaller increments dependent on the ratio between $ebmin_{[k]}$ and $ebmin_{[k-1]}$ without varying from the teachings of the present invention. Accordingly, the values for α may be any amount between 0 and 1, including 0 and 1.

Because many varying and different embodiments may be made within the scope of the inventive concept taught herein, and because many modifications may be made in the embodiments detailed herein in accordance with the descriptive requirements of the law, it is to be understood that the details herein are to be interpreted as illustrative and not in a limiting sense.

I claim:

1. A method for estimating background noise in a signal comprising the following steps:
    establishing a minimum energy level to distinguish noise from signal information;
    estimating the background energy level of said signal by:
        dividing said signal into blocks of equal predetermined lengths;
        determining the minimum energy of the signal for each said signal block;
        comparing the determination of minimum energy for a current signal block to a determination of minimum signal energy for the previous block;
        using said comparison to adjust the estimation of minimum energy in a signal block; and
        estimating background energy by applying the following formula:

$$En_{[k]} = (1-\alpha)*En_{[k-1]} + \alpha ebmin_{[k]}$$

wherein $En_{[k]}$ is defined as the determined minimum energy level of a current signal block,
   $En_{[k-1]}$ is defined as the determined minimum energy level of a previous signal block,
   $ebmin_k$ is defined as the estimated minimum energy level of the signal, and
   α is defined as a factor based upon relationship of the determined minimum energy level of the current signal block and the determined minimum energy level of the previous signal block.

2. The method for estimating background noise in a signal of claim 1, further comprising setting α to a factor of 1 if the energy level of the current signal block is less than the energy level of the previous signal block.

3. The method for estimating background noise in a signal of claim 1, further comprising setting α to a factor of any amount between and including 0 and 1.

4. The method for estimating background noise in a signal of claim 1, further comprising setting α to a factor of 0 if the energy level of the current signal block is greater than a maximum acceptable minimum block energy.

5. The method for estimating background noise in a signal of claim 4, wherein the current background energy estimate of the current signal block is equal to a background energy estimate of a previous signal block.

6. The method for estimating background noise in a signal of claim 1, further comprising setting α to a factor of 0.5 if the determined minimum energy level of the current signal block is greater than the determined minimum energy level of the previous signal block and less than a maximum acceptable minimum block energy.

7. The method for estimating background noise in a signal of claim 6, wherein the current background energy estimate is halfway between a background energy estimate for the signal and the determined minimum energy of the current signal block.

* * * * *